US011548253B2

(12) United States Patent
Gaben et al.

(10) Patent No.: US 11,548,253 B2
(45) Date of Patent: Jan. 10, 2023

(54) HOT-PRESSING TOOL, METHOD OF OPERATING IT, AND CORRESPONDING INSTALLATION AND METHOD OF MANUFACTURE

(71) Applicant: I-TEN, Dardilly (FR)

(72) Inventors: Fabien Gaben, Dardilly (FR); Jean-Michel Burry, Port (FR)

(73) Assignee: I-TEN, Dardilly (FR)

( * ) Notice: Subject to any disclaimer, the term of this patent is extended or adjusted under 35 U.S.C. 154(b) by 931 days.

(21) Appl. No.: 16/324,935

(22) PCT Filed: Aug. 22, 2017

(86) PCT No.: PCT/FR2017/052252
§ 371 (c)(1),
(2) Date: Feb. 12, 2019

(87) PCT Pub. No.: WO2018/037185
PCT Pub. Date: Mar. 1, 2018

(65) Prior Publication Data
US 2021/0276296 A1   Sep. 9, 2021

(30) Foreign Application Priority Data

Aug. 25, 2016 (FR) .................................... 1657911

(51) Int. Cl.
*B30B 15/34* (2006.01)
*B30B 15/06* (2006.01)
(Continued)

(52) U.S. Cl.
CPC ........ *B30B 15/064* (2013.01); *B29C 35/0805* (2013.01); *B30B 15/34* (2013.01); *B29L 2031/3468* (2013.01)

(58) Field of Classification Search
CPC ... B30B 15/34; B30B 15/064; B29C 35/0805; B29L 2031/3468; H01M 10/058; H01M 10/0525; H01M 10/0468
See application file for complete search history.

(56) References Cited

U.S. PATENT DOCUMENTS 2,312,232 A   2/1943 Cornelis
4,103,413 A * 8/1978 Malmberg ............. B21D 28/34
29/465

(Continued)

FOREIGN PATENT DOCUMENTS

DE   202006008399 U1   8/2006
FR        2956523 A1   8/2011

*Primary Examiner* — Jimmy T Nguyen
(74) *Attorney, Agent, or Firm* — Jordan IP Law, LLC; Todd A. Vaughn

(57) ABSTRACT

A hot-pressing tool mounted on a press and operable under a controlled atmosphere, a method for implementing such a hot-pressing tool, and a facility for manufacturing objects that includes such a hot-pressing tool. The tool includes a first tool portion having a first fastening device to fasten onto a first platen, a second tool portion having a second fastening device to fasten onto a second platen. The first fastening device and the second fastening device are mobile with respect to one another to define a pressing chamber having an inner volume which is heated via a heating device. The first fastening device and the second fastening device each respectively have a pressing member to exert a pressing force on opposite faces of an object to be pressed in the pressing chamber. The heating device is to heat via optical radiation that is concentrated on the object via a concentration device.

20 Claims, 11 Drawing Sheets

(51) Int. Cl.
 *B29C 35/08* (2006.01)
 *B29L 31/34* (2006.01)

(56) References Cited

U.S. PATENT DOCUMENTS

| | | | |
|---|---|---|---|
| 5,891,291 A * | 4/1999 | Okamoto | B30B 7/02 |
| | | | 156/273.9 |
| 2005/0188734 A1* | 9/2005 | Schroth | B21D 37/16 |
| | | | 72/60 |
| 2005/0284320 A1 | 12/2005 | Sakuarai et al. | |
| 2006/0198917 A1 | 9/2006 | Ho et al. | |
| 2010/0104682 A1 | 4/2010 | Ando et al. | |
| 2014/0318392 A1* | 10/2014 | Sajgalik | C04B 35/5611 |
| | | | 100/315 |
| 2015/0004762 A1* | 1/2015 | Shimoda | B41J 2/1645 |
| | | | 438/239 |
| 2015/0040727 A1* | 2/2015 | Kosslow | B30B 13/00 |
| | | | 266/171 |
| 2016/0175910 A1* | 6/2016 | Luetkemeyer | B21D 22/208 |
| | | | 72/352 |
| 2016/0183327 A1 | 6/2016 | Engel et al. | |

* cited by examiner

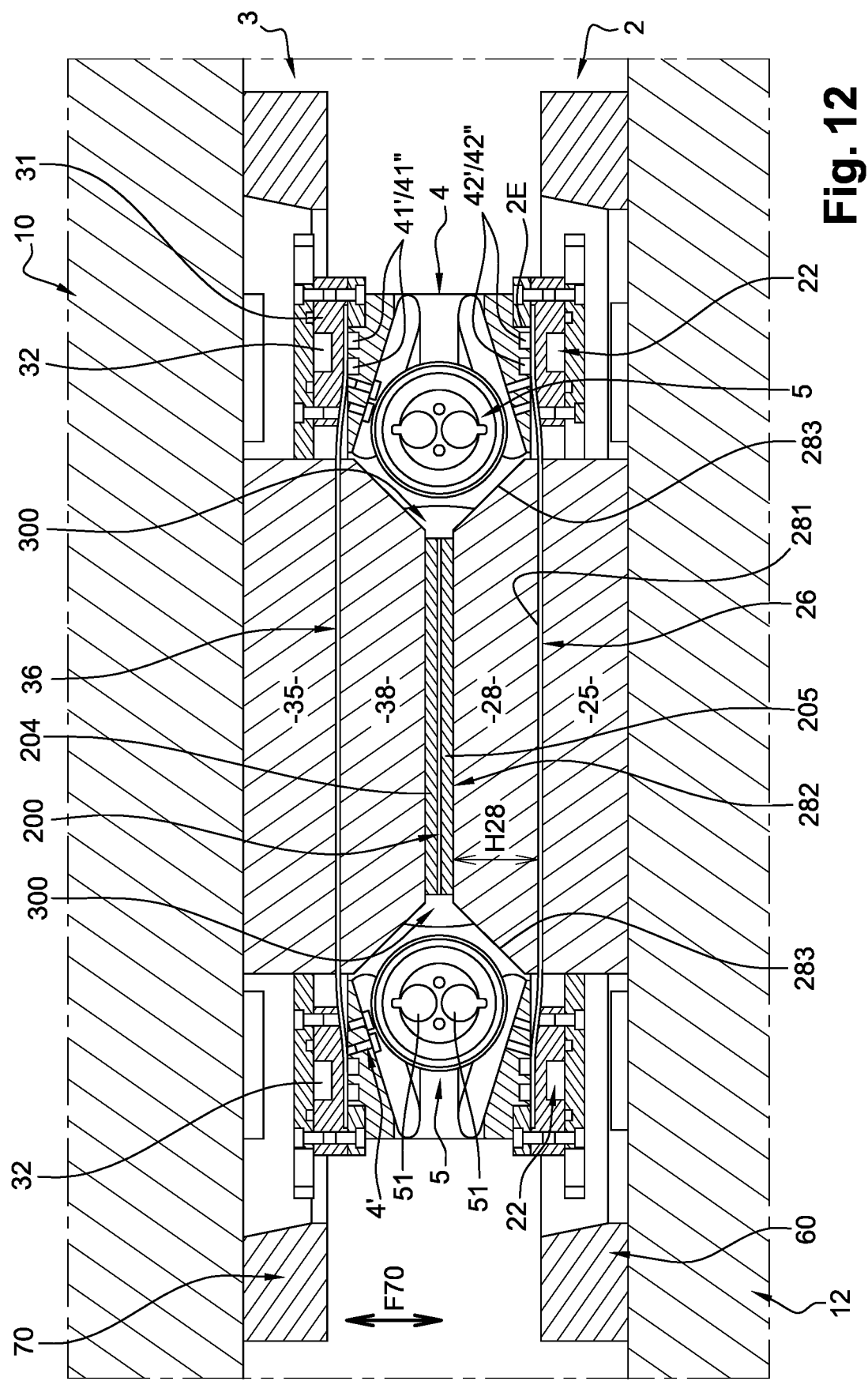

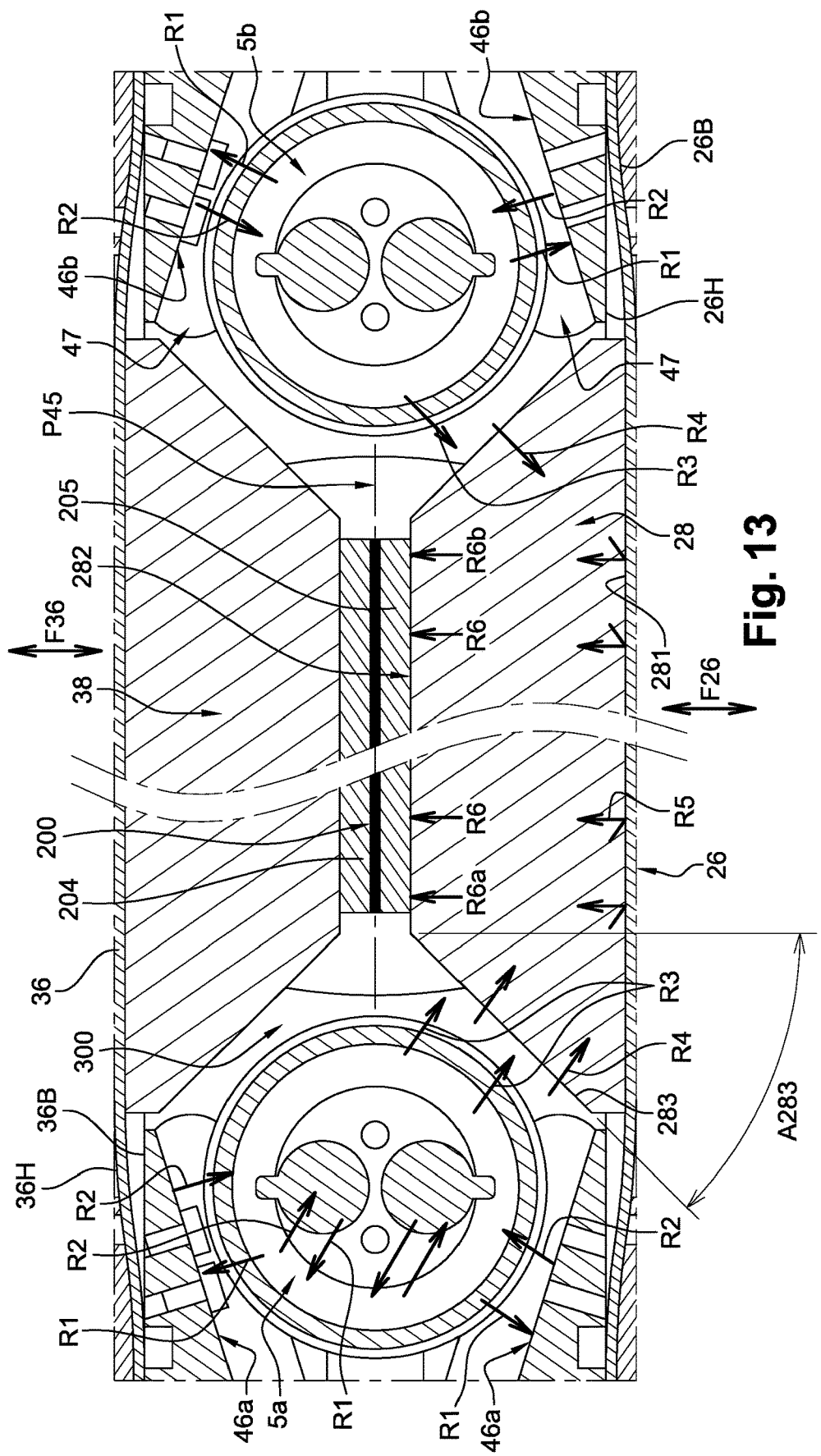

HOT-PRESSING TOOL, METHOD OF OPERATING IT, AND CORRESPONDING INSTALLATION AND METHOD OF MANUFACTURE

CROSS-REFERENCE TO RELATED APPLICATIONS

The present application is a National Stage Application of PCT International Application No. PCT/FR2017/052252 (filed on Aug. 22, 2017), under 35 U.S.C. § 371, which claims priority to French Patent Application No. 1657911 (filed on Aug. 25, 2016), which are each hereby incorporated by reference in their respective entireties.

TECHNICAL FIELD

The invention relates to a hot-pressing tool, intended to be mounted on a press. It relates more particularly, but not exclusively, to such a pressing tool that is intended to operate under a controlled atmosphere, in particular under vacuum. The object of the invention is also a method for implementing such a hot-pressing tool. It is also aimed at a facility for manufacturing objects, comprising such a hot-pressing tool. A preferred, but non-exclusive, use of this facility is the manufacturing of all-solid lithium-ion batteries. Finally, the invention relates to a method for implementing such a facility.

BACKGROUND

In a known manner, a hot-pressing tool comprises two portions, in general respectively upper and lower, that are mounted on respective platens. The latter are mobile with respect to one another under the action of movement means, typically cylinders. The two tool portions can thus adopt a mutually distant position, as well as a mutually close position in which they define a reception chamber, with a view to the pressing of the elements forming the object to be manufactured.

Moreover, such a hot-pressing tool is provided with heating means, allowing to bring the inner volume of the aforementioned chamber to a temperature appropriate for a satisfactory pressing operation. Finally, in the case in which this tool operates under vacuum, there are means intended to place the inner volume of the chamber under vacuum. The respective numerical values of exerted pressure, of temperature and optionally of vacuum in the chamber, are a function of the tool and of the nature of the objects to be manufactured.

Hot-pressing tools of the aforementioned type have already been proposed, for the manufacturing of items of various types. Mention is made, for example, of Chinese Patent Application Nos. CN103158252B and CN101758638, which relate to the manufacturing of flat waveguides, Japanese Patent Application No. JP5576636, the object of which is the production of parts made of resin, European Patent Application No. EP2251188 which relates to the manufacturing of objects in the form of a pad, or Chinese Patent Application No. CN101468370B which describes a production of alloys. In these various documents, the heating is implemented electrically, or via induction.

The tools of the prior art, mentioned above, have, in particular, a major limit on the thermal level. Indeed, their implementation is accompanied by a significant dissipation of the heat produced, outside of the target zone in which the elements forming the part to be pressed are located. Consequently, given the range of temperatures at which the pressing method is carried out, it is necessary to produce a particularly large quantity of heat.

Moreover, in the prior art described above, the temperature during use is very high, not only in the pressing zone strictly speaking, but also near the latter. In these conditions, the mechanical manufacturing of the auxiliary elements necessary for the correct operation of the tool, like joints or the equivalent, involves a compromise.

First of all, it can be chosen to place these elements at a reduced distance from the pressing zone, in order to limit the overall dimensions. In this case, they must have a significant thermal resistance, which is disadvantageous in terms of manufacturing costs. Alternatively, it can be chosen to manufacture such auxiliary elements at a relatively lower cost. In this case, their low thermal resistance means placing them at a substantial distance from the pressing zone, which significantly increases the dimensions of the tool.

Furthermore, by U.S. Pat. No. 7,473,088, a micro- or nano-imprinting device has been proposed, comprising sources of heating via optical radiation. However, the teaching of this document does not provide a satisfactory solution to the problem of heat dissipation, presented just above.

A preferred, but non-exclusive, field of use of the present invention is the manufacturing of all-solid lithium-ion batteries, called all-solid Li-ion batteries in the present document. Such batteries substantially consist of at least one elementary cell, each of which is formed by an assembly of three layers, namely an anode layer, a cathode layer, and an intermediate layer of electrolyte.

The invention can be applied to the two main modes of manufacturing such a battery, involving different ranges of pressure and of temperature. First of all, operation can be at high temperature, typically between 400° C. and 700° C., and high pressure, typically between 20 and 200 MPa. In this case, the aforementioned layers are assembled, either by sintering, or by "diffusion bonding" (or welding by diffusion). Alternatively, operation can also be at a lower temperature, typically between 100° C. and 200° C., and lower pressure, typically between 5 and 10 MPa. In this case, the aforementioned layers are assembled, either by gluing, or by polymerization.

French Patent Publication No. FR 2 956 523 describes a method for manufacturing an all-solid battery, involving assembly via sintering. According to this method, the three aforementioned layers are placed in a die, then are subjected to a pressure of 100 MPa for 7 minutes. This provokes the sintering of these layers to each other, which gives them the desired cohesion. The pressing operation is carried out under vacuum, with progressive heating allowing to reach a temperature of 650° C. The temperature ramps are obtained by heating of the electric type, namely by applying pulsed direct currents.

Mention is also made of U.S. Pat. No. 7,695,865 which describes a method for production of a battery, wherein the assembly of the thin layers is implemented via gluing. This method involves heating, via a device of an optical nature. The pressing temperature is less than or equal to 120° C., while the pressure is between 50 and 500 kg/cm.

These two latter solutions have, however, certain limits. Indeed, even though French Patent Publication No FR 2 956 523 and U.S. Pat. No. 7,695,865 contribute substantial specifications on the manufacturing method, they only describe the corresponding facility schematically. Upon reading these documents, it is not therefore possible to obtain meaningful information, on the structural level. In particular, these documents do not provide any teaching regarding the management of the heat dissipation, a teaching that would be useful for being able to resolve the technical problem presented above.

Moreover, U.S. Patent No. 2016/183327 describes a device for heating a composite material comprising two shells, defining a reception chamber for the composite material. A film can be interposed between this material and the upper shell, which is formed by a plurality of modules comprising LEDs (Light Emitting Diodes). The heating of the composite material, placed in the reception chamber, is carried out via the LEDs. This document merely alludes to emission, guiding, distribution and redirection of the light.

German Patent Publication No DE 20 2006 008399 describes a stamping die, which comprises a shaft and an embossing layer. The latter has an active surface, intended to cooperate with a substrate to be treated. In one embodiment, the shaft and the embossing layer are at least partly made from a transparent material, in such a way as to allow the transmission of light along the dotted arrow. This document teaches a simple transmission of the optical energy, via the walls of the head of the shaft.

U.S. Pat. No. 2,312,232 discloses a device for producing light, integrating cooling by liquid. This device comprises in particular a lamp unit, formed by a mercury lamp surrounded by a tube made of glass or of quartz. This lamp unit, closed by two end caps, is surrounded by a sleeve allowing the circulation of a cooling liquid.

U.S. Patent Publication No. 2005/284320 describes an apparatus allowing to laminate a structure, formed by a substrate, a magnetic film and a resistive film. This apparatus comprises first of all two platens and a light source, placed radially at a distance from the platens and located at the same altitude as the structure to be treated.

U.S. Patent Publication No. 2010/104682 describes an imprinting device, comprising two pressing members mounted on respective platens. Light sources are placed directly in the aforementioned platens.

SUMMARY

Given the above, one goal of the present invention is thus to overcome, at least partially, the disadvantages of the prior art mentioned above.

A main goal of the invention is to provide a satisfactory structural solution, in order to propose a tool allowing to create an object via hot pressing, in a way that is both particularly efficient and relatively simple.

Another goal of the invention is to propose a hot-pressing tool, the implementation of which advantageously does not generate a substantial increase in temperature, except for the zone in which the pressing forces are exerted.

Another goal of the invention is to propose such a tool that is accompanied by flexible implementation, in such a way as to vary the parameters of the method in a convenient manner.

Another goal of the invention is to propose a facility equipped with such a tool, said facility being very particularly adapted to the manufacturing of an object formed by a plurality of layers, in particular to the manufacturing of an all-solid Li-ion battery.

Another goal of the invention is to propose such a manufacturing facility, which allows to obtain effective cohesion between the various layers forming such a battery.

According to the invention, the above goals are achieved by means of a hot-pressing tool O1; O2 intended to be mounted on a press, this tool comprising: a first tool portion 2 equipped with first means 29; 60 for fastening onto a first platen 12; a second tool portion 3 equipped with second means 13, 14; 70 for fastening onto a second platen 10, wherein these two tool portions are mobile with respect to one another between a distant position and a close position, in which they define a pressing chamber 300; means 5 for heating the inner volume of the pressing chamber, wherein the first and second tool portions further being respectively equipped with a first and second pressing member 28, 38, which are suitable for exerting a pressing force on opposite faces of an object to be pressed, received in the pressing chamber, wherein the heating means are means 5 for heating by optical radiation; and concentration means 26, 28, 36, 38, 46, capable of concentrating the radiation energy in the direction of said object.

According to other features of the tool according to the invention, taken alone or in any technically compatible combination:

- the heating means comprise at least one member 5 for heating via optical radiation, each heating member comprising at least one quartz lamp 51, a sleeve 52 for receiving each lamp 51, at least one cap 53, 54 axially extending said sleeve, the facing walls of the cap and of the sleeve defining an annular space capable of being placed in communication with a source of heat-transfer fluid; one of the pressing members defines a polygonal seat 282, in particular rectangular, for receiving said object to be pressed, and a member 5 for heating via optical radiation is provided along each side of this polygonal seat;
- each heating member 5 is received in an open housing 45, defining an opening 47 for emission of the optical radiation;
- the concentration means comprise a reflection section 46, belonging to the walls of the housing 45 for receiving each heating member, said reflection section being placed facing the radiating zone 51 of the heating member, and the coating of said reflection section being capable of sending back the optical-radiation energy;
- the walls of the housing 45 further comprise at least one section called absorption section 46', facing a non-radiating zone 54 of the heating member, in particular its cap, the coating of the absorption section being suitable for absorbing the radiation energy;
- a first tool portion 3 is equipped with an annular supporting member 4, defining the or each housing for receiving a heating member;
- the annular supporting member 4 comprises a front face called free front face 42, capable of being stopped against the second tool portion 2;
- sealing means are provided between the free front face and the second tool portion, in particular at least one O-ring 42" received in at least one groove 42' arranged in said free front face 42;
- the annular supporting member 4 is hollowed out by at least one cutout 48, allowing access to a respective reception housing 45, from the outer face 44 of this supporting member;
- the annual supporting member 4 is provided with at least one shutter 48' for closing each cutout, removably fastened onto said outer face 44;
- the tool comprises transverse-positioning means, allowing to mutually position the two tool portions in a direction transverse with respect to the pressing direction;
- the transverse-positioning means comprise complementary shoulders, respectively arranged on the supporting ring and on the second tool portion;

the means for concentrating the radiation energy comprise, for each tool portion, a member 28, 38 for concentrating the optical radiation and a member 26, 36 for reflecting the optical radiation, interposed along the trajectory of the radiation between the emission opening 47 and the seat 282 for receiving the object to be pressed;

the member 28, 38 for concentrating the optical radiation has two opposite front faces, these two opposite front faces being connected by oblique lateral faces 283, each lateral face being adjacent to a respective heating member 5;

the member 28, 38 for concentrating the optical radiation is made from silica;

each member 28, 38 for concentrating the optical radiation forms a pressing member, the upper front face of the lower member for concentrating the optical radiation forming the reception housing 282;

the member 26, 36 for reflecting the optical radiation is disposed against a front face 281 of said member 28, 38 for concentrating the optical radiation;

the member 26, 36 for reflecting the optical radiation is made from polished aluminum;

the tool further comprises means 49 for placing the pressing chamber 300 under a controlled atmosphere, capable of being connected to a source for supplying inert gas and/or a source of vacuum;

the means for fastening each tool portion onto a respective platen are means for removable fastening of the mechanical type, in particular by screwing 13, 14 29;

the means for fastening each tool portion onto a respective platen are means for removable fastening of the magnetic type 60, 70.

The above goals are also achieved by means of a method for implementing the above tool, wherein:

the two tool portions 2, 3 are placed in their mutually distant position, at least one object to be pressed 200 is disposed on the pressing seat 282, the tool portions are moved towards their mutually close position, in such a way as to define a pressing chamber 300 and confine said object in said pressing chamber, the inner volume of this chamber is heated, up to a target temperature, and a pressure is exerted on the opposite faces of said object, while maintaining the inner volume of this chamber at a temperature close to the target temperature.

According to other features of the method according to the invention, taken alone or in any technically compatible combination:

the inner volume of this pressing chamber is placed at a pressure much lower than atmospheric pressure, for example at a pressure less than or equal to 10-3 mbar;

a gas, in particular an inert gas, is let into the inner volume of this pressing chamber;

at least one of the opposite faces 201, 202 of said object 200 is covered by means of a mechanical protective element 204, 205, further suitable for absorbing the optical-radiation energy, in particular a protective plate having a dark-colored coating;

the object is a stack comprising at least one elementary cell, each of which is formed by an anode layer, a cathode layer and an intermediate layer of solid electrolyte;

the inner volume of this chamber is brought to a temperature between 400 and 700° C. and a pressure between 100 and 200 MPa is exerted on the opposite faces of said object;

the inner volume of this chamber is brought to a temperature between 100 and 200° C. and a pressure between 5 and 10 MPa is exerted on the opposite faces of said object;

each tool portion is separately mechanically fastened onto a respective platen;

the two tool portions are magnetically fastened onto a first platen, the second platen is brought closer in such a way as to magnetically fasten the second tool portion onto this second platen, and the second platen is moved away from the first platen, in such a way as to move the two tool portions away from each other;

a plurality of objects to be pressed are disposed, on top of each other, between the pressing members of said pressing tool;

a plurality of pressing tools are disposed, on top of each other, between the first and second platen.

The above goals are also achieved by means of a facility for manufacturing objects comprising:

a pressing tool O1; O2 like above, a first and second platen 10, 12, means 106 for controlling the pressing tool and the platens, manipulation means 112, 114, suitable for placing the objects to be pressed onto the pressing seat of the pressing tool, then for extracting the objects, once pressed, out of said pressing seat.

According to an advantageous feature, the facility according to the invention further comprises a source 110 of vacuum and/or a source 111 of gas, suitable for being connected to the means 49 for placing the pressing chamber under a controlled atmosphere.

The above goals are also achieved by means of a method for manufacturing an all-solid Li-ion battery, using an above facility, wherein:

a stack comprising at least one elementary cell, each of which is formed by an anode layer, a cathode layer and an intermediate layer of solid electrolyte, is placed on the pressing seat, via the manipulation means;

said stack is hot pressed by means of said pressing tool;

once pressed, said stack is extracted out of said pressing seat, via the manipulation means;

said pressed stack is optionally subjected to at least one later finishing operation, in such a way as to obtain said all-solid lithium-ion battery.

According to an advantageous feature of this method, the pressing operation is carried out in such a way that at least one layer, preferably all the layers, of said battery have a porosity of less than 20%, preferably less than 10% and even more preferably less than 5%.

The above goals are also reached by means of an all-solid lithium-ion battery capable of being obtained according to a manufacturing method like above.

According to an advantageous feature of this battery, at least one layer, preferably all the layers, of said battery have a porosity of less than 20%, preferably less than 10% and even more preferably less than 5%.

DRAWINGS

The invention will be described below, in reference to the appended drawings, given only as non-limiting examples, in which:

FIG. 12 is a longitudinal cross-sectional view analogous to FIG. 1, illustrating a pressing tool according to a second embodiment of the invention, in a position in which its two component parts are close to each other.

FIG. 13 is a longitudinal cross-sectional view analogous to FIG. 12, illustrating on a much larger scale the trajectory of the optical radiation inside the pressing chamber belonging to the pressing tool of this FIG. 12, in a position in which this tool exerts a pressing force on the stack of FIG. 11.

DESCRIPTION

The appended drawings describe two embodiments of a hot-pressing tool, according to the invention. In the examples illustrated these tools are used for the treatment of stacks, or assemblies, described in more detail in reference to FIG. 11. As will be seen below, these stacks are intended to form all-solid Li-ion batteries. As was explained above, these batteries can be, in particular, assembled at a high temperature and high pressure, via sintering or diffusion welding, or at a lower temperature and lower pressure, via gluing or polymerization.

Nevertheless, the pressing tool according to the invention can be provided with other uses, in particular, the manufacturing of all types of objects that uses assembly via sintering, diffusion welding, polymerization or gluing, between at least some components of this object. In a more general manner, the pressing tool according to the invention is well adapted for creating assemblies, such as those created by means of the solutions of the prior art presented in the preamble of the present description.

Figure 14:
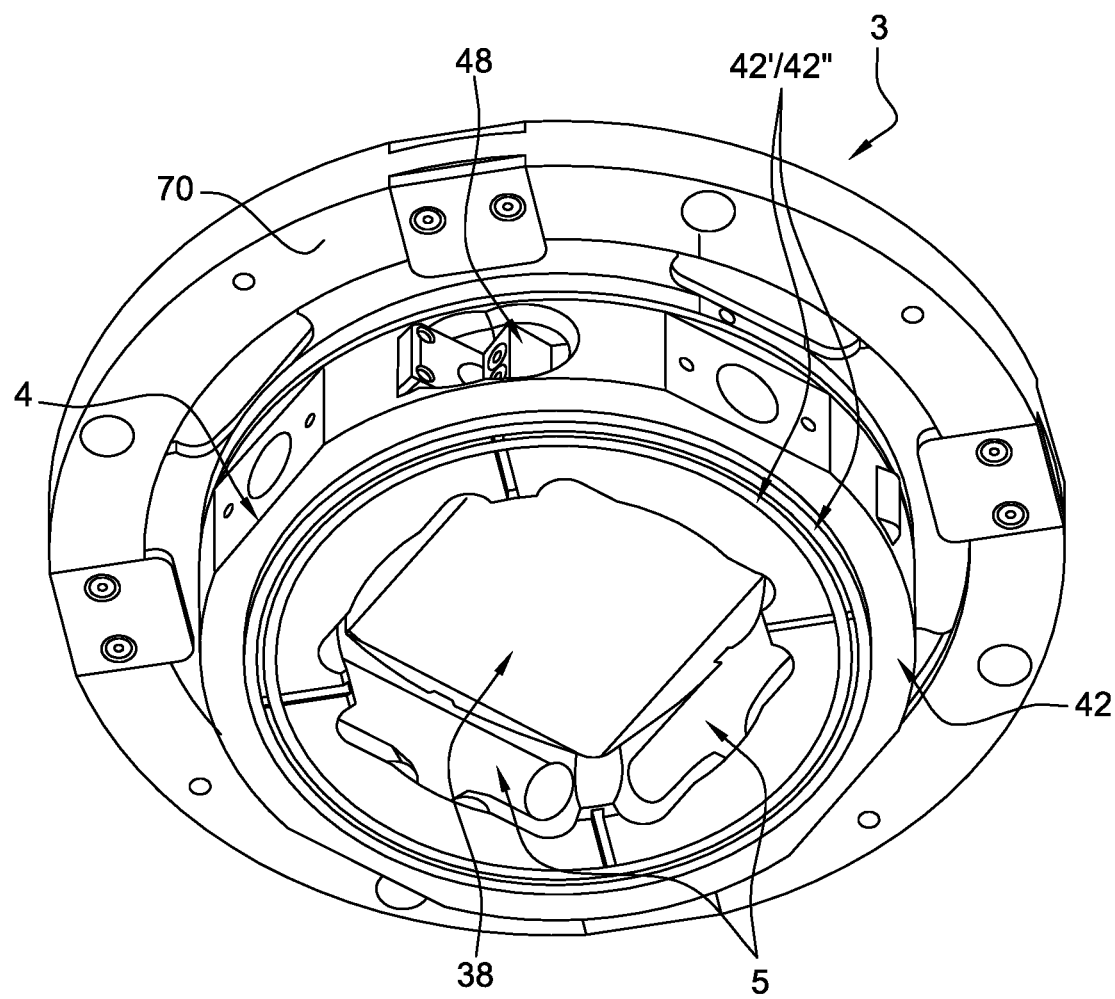
FIG. 14 is a perspective view, illustrating a bottom view of the upper component portion of the pressing tool of FIG. 12.

FIGS. 1 to 10 illustrate a pressing tool according to a first alternative of the invention, which is designated as a whole by the reference O1. This tool O1 is intended to be mounted on a press, via means for removable fastening of a mechanical nature, which will be described in detail below. FIGS. 12 to 14 illustrate a pressing tool according to a second alternative of the invention, which is designated as a whole by the reference O2. As will be seen below, this tool O2 substantially differs from that O1 described above, in that it is intended to be mounted on the press via means for removable fastening of a magnetic nature.

In FIGS. 12 to 14, the mechanical elements of the tool O2, identical to those of the tool O1, are assigned the same reference numbers therein. In order to describe these mechanical elements, common to both embodiments, reference will be made indifferently either to FIGS. 1 to 10 or to FIGS. 12 to 14. However, the mechanical elements of the tool O2, which are different than those of the tool O1 by their structure and/or their function, are assigned different reference numbers.

Figure 1:
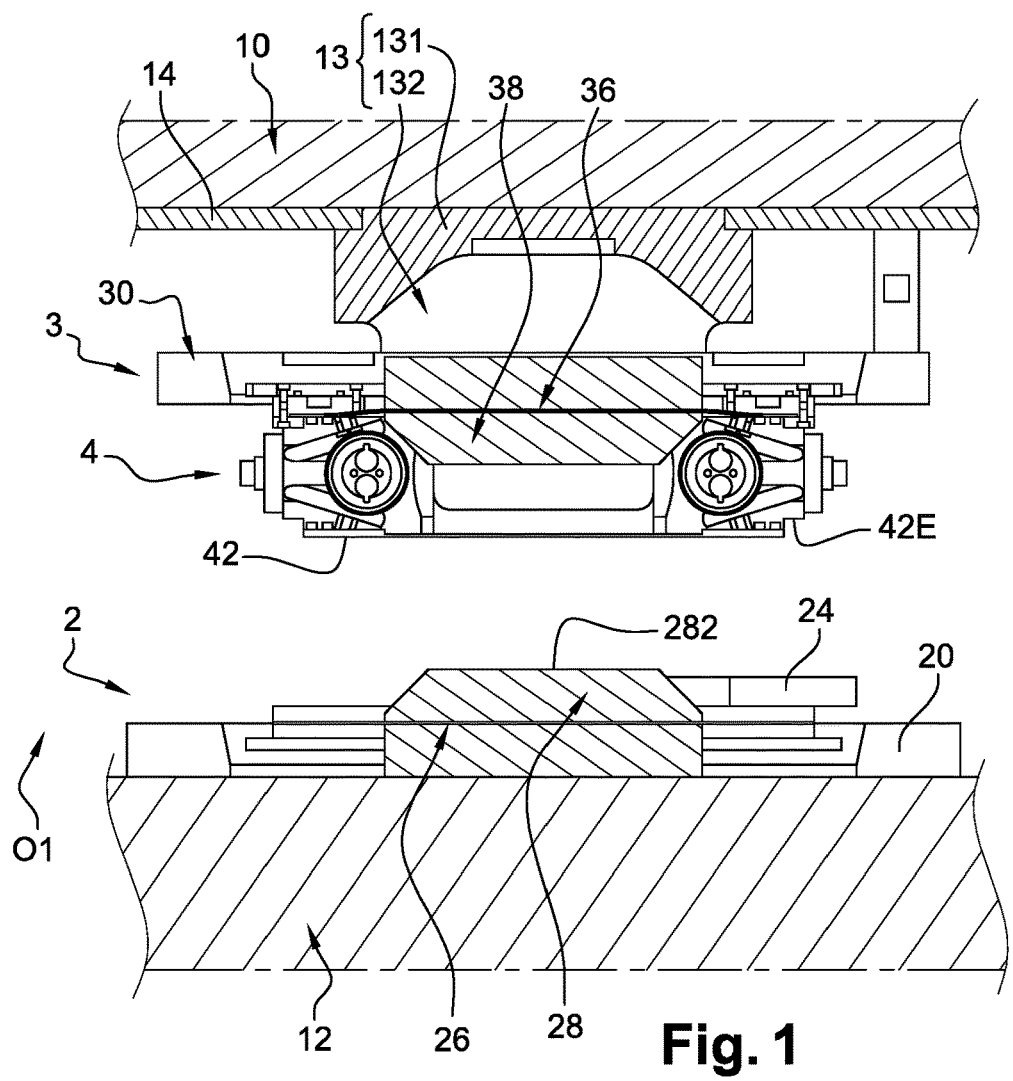
FIG. 1 is a longitudinal cross-sectional view, illustrating a pressing tool according to a first embodiment of the invention, in a position in which its two component parts are distant from one another and are mounted on two respective platens.
Figure 10:
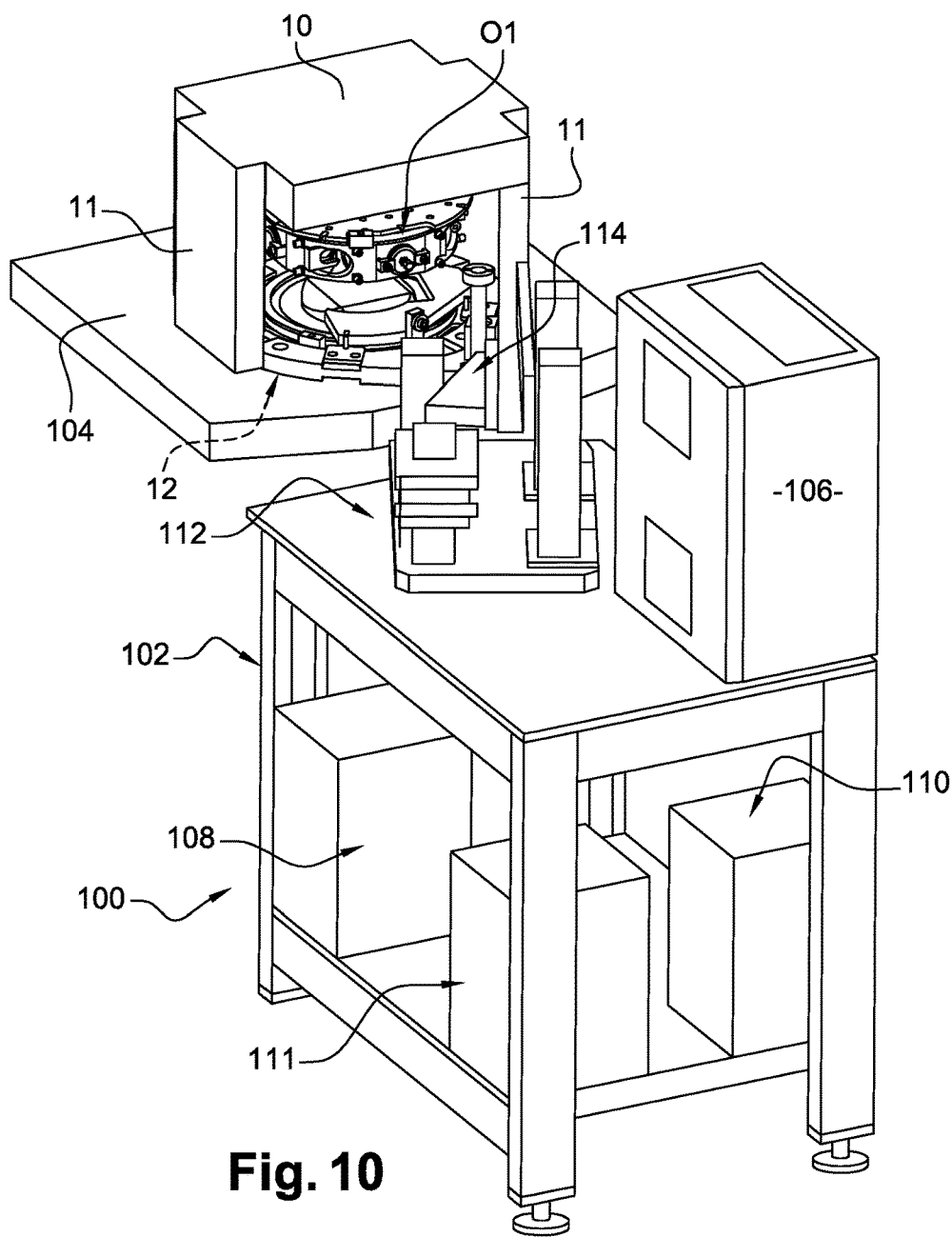
FIG. 10 is a perspective view illustrating a facility for manufacturing objects comprising in particular a pressing tool according to the invention, mounted on two platens.

The press is visible in FIG. 10, while being illustrated on a larger scale, partially, in FIG. 1. In a manner known per se, this press comprises a fixed upper platen 10, resting on cheeks 11 extending from a support 104, belonging to a frame 102. The support and the frame are visible in FIG. 10, which shows other mechanical elements that will be described in more detail below. The press further comprises a lower platen 12, more particularly visible in FIG. 1.

This lower platen 12 is mobile with respect to the upper platen 10 in a direction called pressing direction, which is perpendicular to the main plane of each platen, in this case vertical in the example illustrated. The movement of this lower platen, which slides through an opening that is not shown, made in the aforementioned support 104, is implemented via any appropriate means, for example cylinders that are not shown. As alternatives that are not shown, there can be an upper platen mobile with respect to a fixed lower platen, or two platens mobile with respect to the support.

Figure 3:
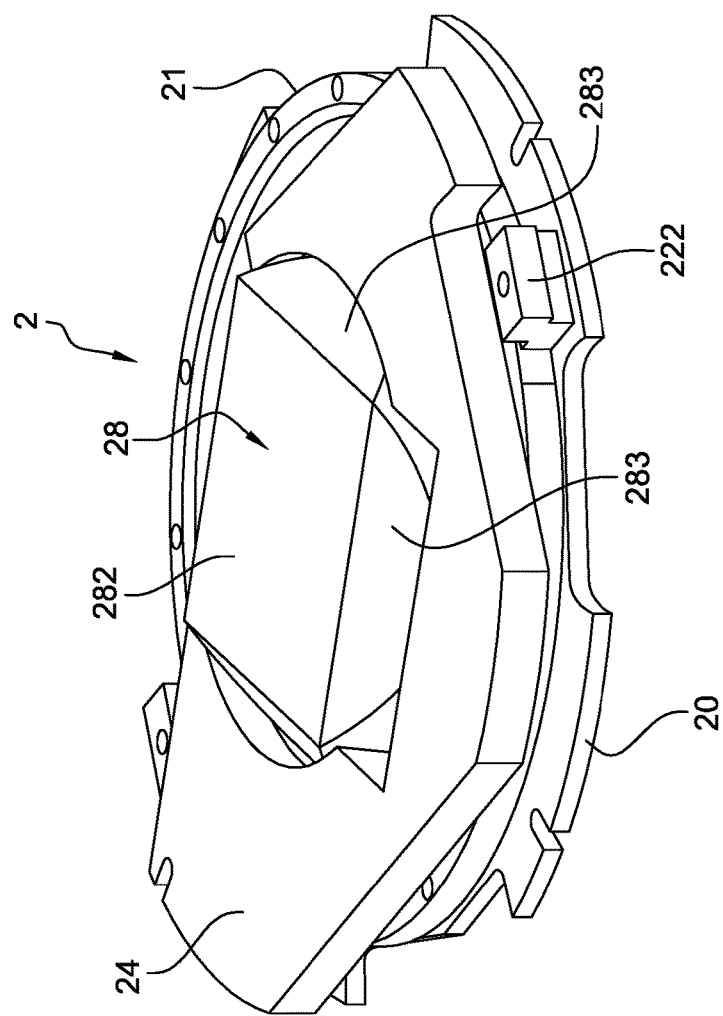
FIG. 3 is a perspective view, illustrating this lower tool portion, once assembled.
Figure 2:
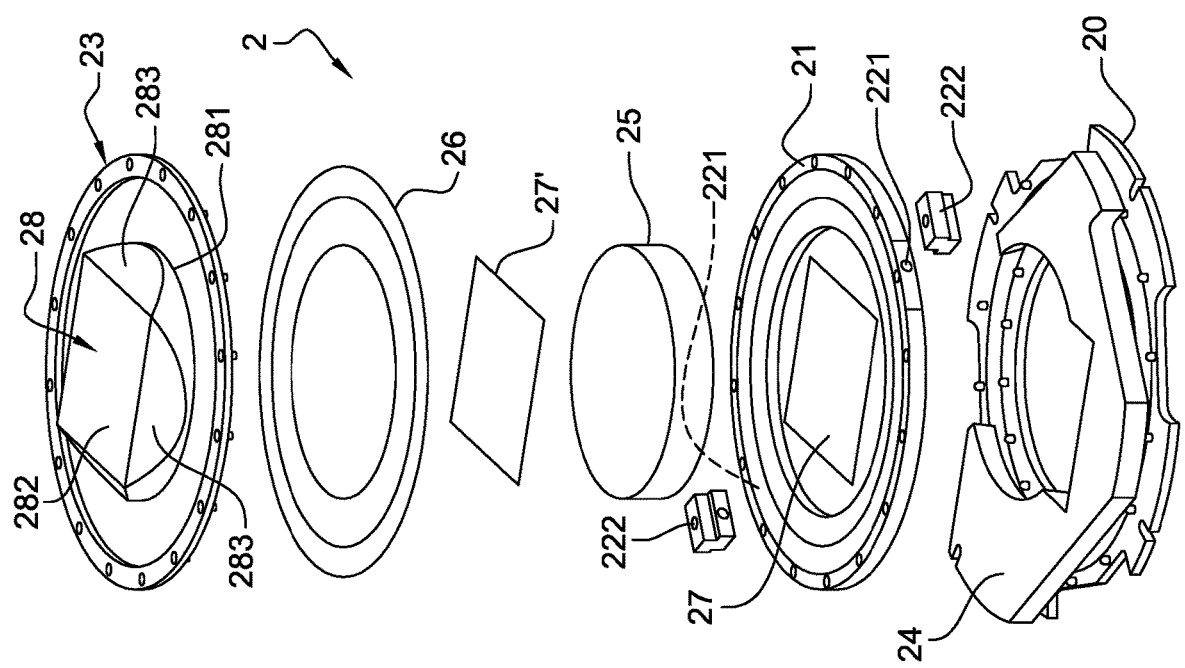
FIG. 2 is a perspective view, illustrating in an exploded manner the elements forming the lower portion of the pressing tool shown in FIG. 1.

In reference to FIG. 1, the hot-pressing tool O1 comprises two tool portions 2 and 3, each of which is mounted on a respective platen. As FIGS. 2 and 3 show, the tool portion 2 comprises a sole 20, fastened to a spacer part 21 via any appropriate means, in particular by screwing, with interposition of sealing joints not shown in these drawings. The lower face of the spacer part 21 is hollowed out by channels 22 for circulation of a heat-transfer fluid (see FIG. 12), from a remote unit visible in FIG. 10 and which will be described below. The inputs 221 of these channels are visible in this FIG. 2, just like the connectors 222 providing the connection with the aforementioned source of fluid. The spacer part 21 is fastened, in particular by screwing, onto a flange 23 also having an annular shape, which supports a template 24 for centering and positioning.

The central space of the above elements 20, 21, 23 and 24 is occupied first of all by a base 25, having a cylindrical shape, which forms a member for transmitting stresses, during the pressing operation. This base 25 supports a disc 26, the periphery of which is maintained in position by the aforementioned flange 23. This disc 26 forms an optical member called intermediate optical member, that is to say that it is interposed on the trajectory of the radiation between the optical-heating members and the seat for receiving the object to be pressed. This disc 26 forms a reflector, that is to say that it is adapted for reflecting substantially all of the optical radiation that it receives. For this purpose, it is typically made of aluminum. Moreover, its surface in contact with the optical radiation, that is to say its upper surface in the example illustrated, is polished.

Advantageously, a pad 27 is fastened, by any appropriate means, onto the lower face of the base 25. This pad 27, for example made of copper, is provided with a temperature probe not shown, of any appropriate type. Moreover, there is an additional pad 27', analogous to that 27 above, the function of which is to provide mechanical protection with respect to the disc 26, in particular during the pressing operation.

Finally, a block 28, the shape of which will be described in more detail below, rests on the disc 26. This block 28 forms another intermediate optical member, that is to say that it is interposed on the trajectory of the radiation between the heating members and the reception seat, just like the disc 26. This block 28 forms a concentrator, that is to say that it is adapted for concentrating the optical radiation coming from the heating members, then directing it towards the aforementioned reflector disc 26. For this purpose, this concentrator 28 is typically made of silica.

As shown in particular by FIGS. 2, 3, 12 and 13, the concentrator 28 comprises a lower face 281, which rests against the reflector 26, and an upper face 282 forming a seat for the stack to be treated according to the invention. Viewed from above, its lower face is circular while its upper face has a substantially square shape. These two faces 281 and 282 are connected by flat lateral faces 283, which are inclined with respect to the vertical direction. Advantageously, each lateral face 283 forms, with this vertical direction, an angle A283, visible in FIG. 13, that is between 30 and 60°, in particular close to 45°.

Given that the upper face 282 of the concentrator has four sides, it is connected to the lower face 281 by four lateral faces 283. Alternatively, there can be, however, a polygonal upper face having a different shape, in particular hexagonal, in which case six lateral faces are provided. A square shape associated with four lateral faces, however, is preferred, which allows to confer a symmetrical nature accompanied by a relatively simple structure.

The dimensions of the face 282 are chosen in such a way as to be slightly greater than those of the stack treated. The height H28 of the concentrator (see FIG. 12) is advantageously between 15 and 45 millimeters. Deductively, the dimensions of the lower face 281 are dependent on those of the face 282, as well as on the height H28 and the angle A283. The radial dimensions of the reflector 26 are chosen in such a way as to be clearly greater than those of the facing face of the concentrator.

Figure 5:
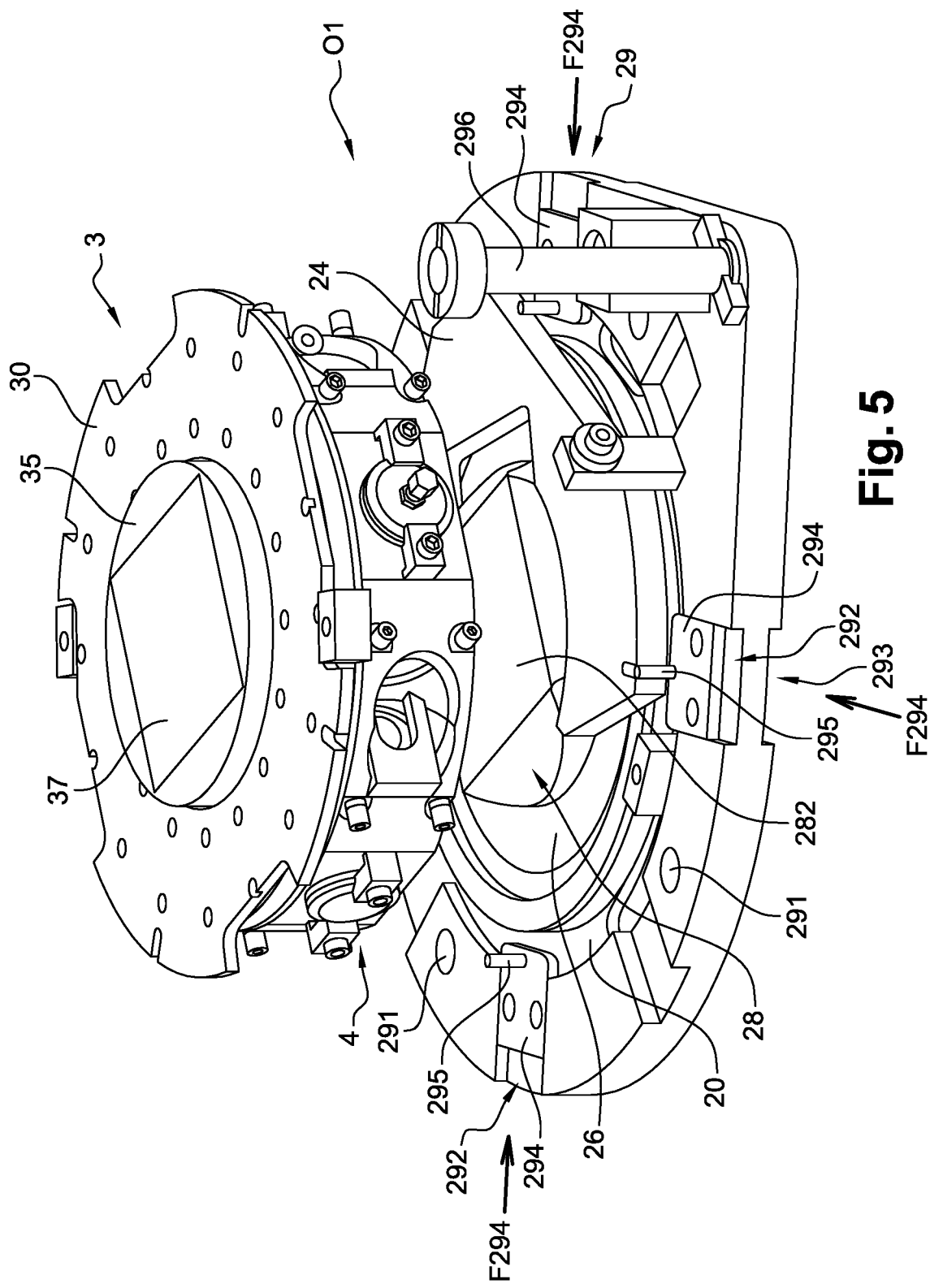
FIG. 5 is a perspective view, illustrating the pressing tool in its position of FIG. 1, the platens not being shown.

The tool portion 2 is fastened onto the lower platen 12, removably, by means of a collar 29 visible in particular in FIG. 5. This collar 29 is first of all pierced by axial orifices 291, allowing the passage of means not shown, like screws, allowing to rigidly connect the collar to the lower platen 12. The collar 29 is further hollowed out by radial notches 292 and 293, on its opposite front faces. Each notch receives a mobile dog 294, with it being understood that all the dogs are not illustrated in this FIG. 5. At its radially inner end, each upper dog 294 is equipped with a locking member 295, suitable for cooperating with the facing lower dog. Finally, the collar 29 is provided with a rod 296, intended for the mounting of a manipulation arm that will be described in more detail below.

With a view to the fastening of the tool portion 2 onto the platen 12, first of all the collar 29 is rigidly connected onto this platen, by placing the dogs 294 radially towards the outside. In this way, the tool portion 2 can be freely inserted into this collar, in the definitive position that it must adopt. Then, the dogs are moved radially towards the inside, according to the arrows F294, then the locking members 295 are actuated. Each pair of dogs thus allows to immobilize the sole 20 and, consequently, the entire tool portion 2, with respect to the collar 29 and, consequently, with respect to the platen 12.

Figure 4:
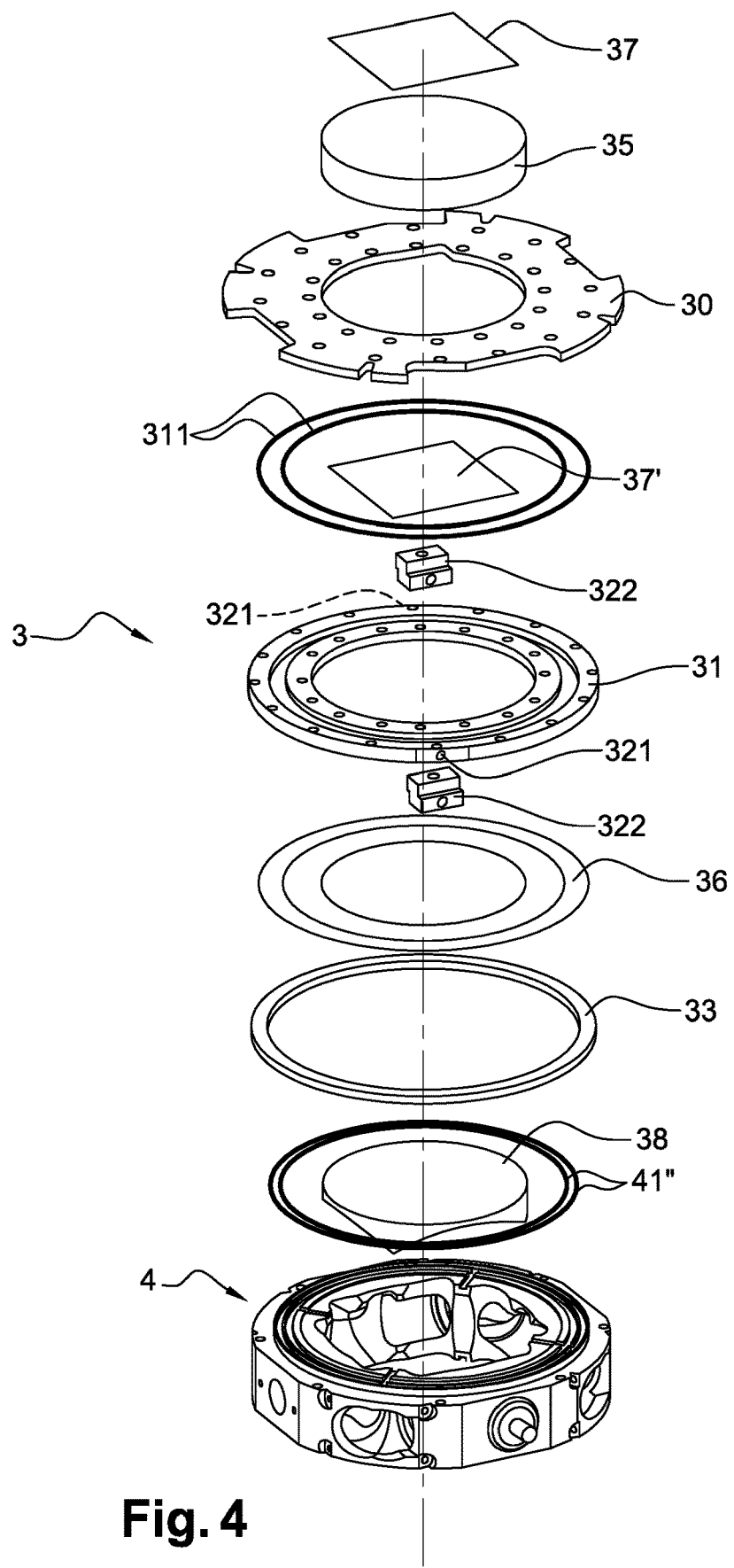
FIG. 4 is a perspective view, illustrating in an exploded manner the elements forming the upper portion of the pressing tool shown in FIG. 1.

As shown in particular in FIGS. 4 and 12, the upper tool portion 3 comprises first of all a sole 30. In a manner known per se, this sole is removably fastened onto the platen 10, with interposition of a ball joint 13. The latter comprises first of all a female sphere 131, rigidly connected to the platen 10 via an intermediate plate 14 screwed into this platen. Moreover, the sole 30 is fastened onto a male sphere 132, cooperating with the aforementioned female sphere 131. The presence of this ball joint 13 provides, in a conventional manner, a satisfactory alignment between the two tool portions 2 and 3, during use.

The sole 30 is fastened to a spacer part 31 by any appropriate means, in particular by screwing, with interposition of sealing joints 311. The lower face of the spacer part 31 is hollowed out by channels 32 for circulation of a heat-transfer fluid, from the aforementioned remote unit. The inputs 321 of these channels are visible in this FIG. 4, just like the connectors 322 providing the connection with this source of fluid. The spacer part 31 is fastened, in particular by screwing, to a flange 33 also having an annular shape.

The central space of the above elements 30, 31 and 33 is occupied first of all by a base 35, having a cylindrical shape, which supports a reflector disc 36, the periphery of which is maintained in position by the aforementioned flange 33. Advantageously, a pad 37 provided with temperature probes is interposed between the base 35 and the base of the case. Moreover, there is an additional pad 37', analogous to that 37 above, the function of which is to provide mechanical protection with respect to the disc 36, in particular during the pressing operation. Finally, a concentrator 38 rests on the reflector 36. The mechanical members 35, 36 and 38 are identical in their function, their nature and their dimensions, respectively to those 25, 26 and 28 described above. This allows to confer a symmetry of the tool, with respect to a median horizontal plane, which is advantageous in terms of quality of pressing and concentration of the optical radiation.

The upper tool portion 3 is further equipped with a ring 4, having a plurality of functions. As will be seen below, this ring first of all forms the peripheral lateral wall of the pressing chamber, during use. Moreover, it provides the support for heating members 5, the structure of which is described below.

Figure 6:
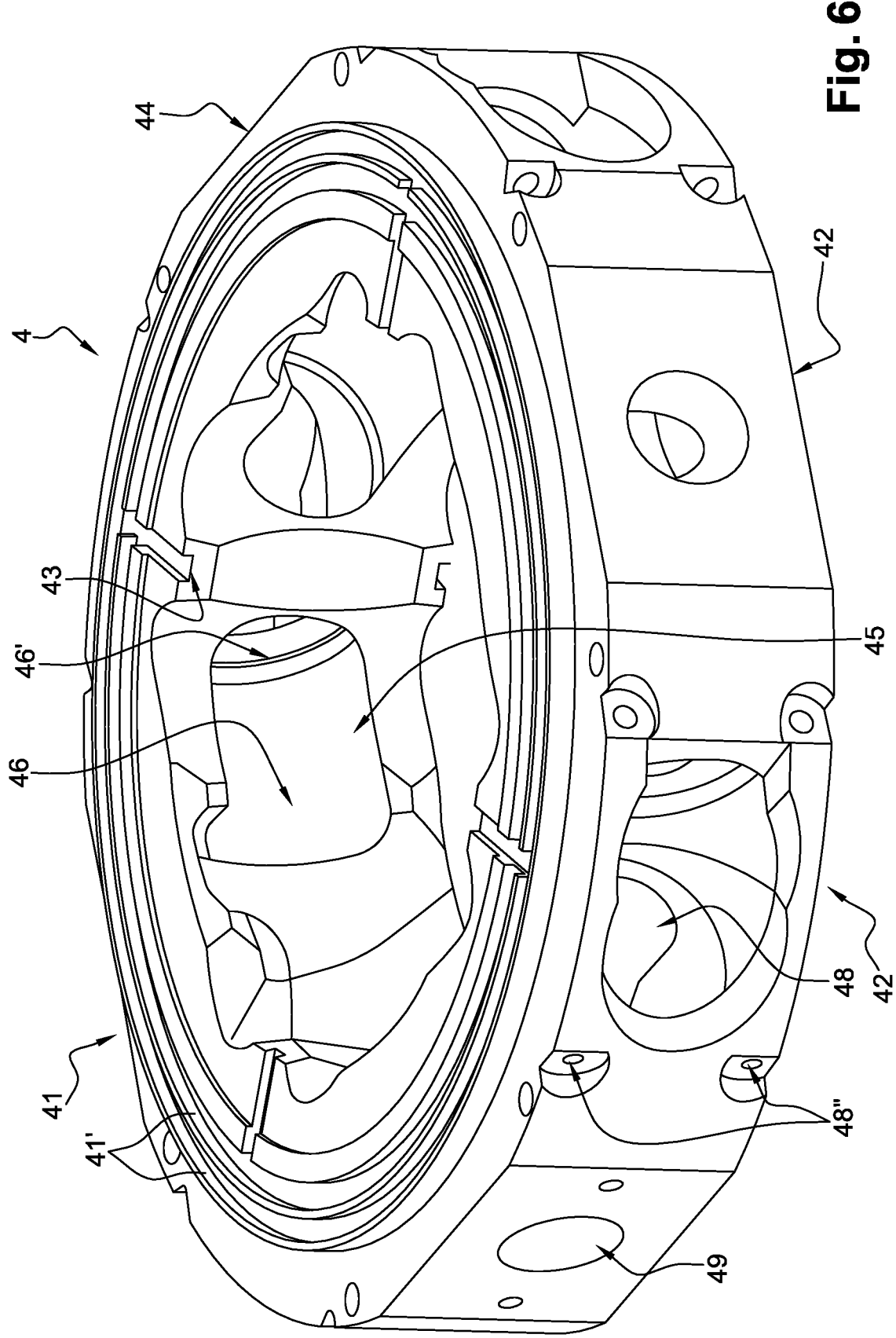
FIG. 6 is a perspective view, more particularly illustrating a supporting ring belonging to the pressing tool according to the invention.
Figure 7:
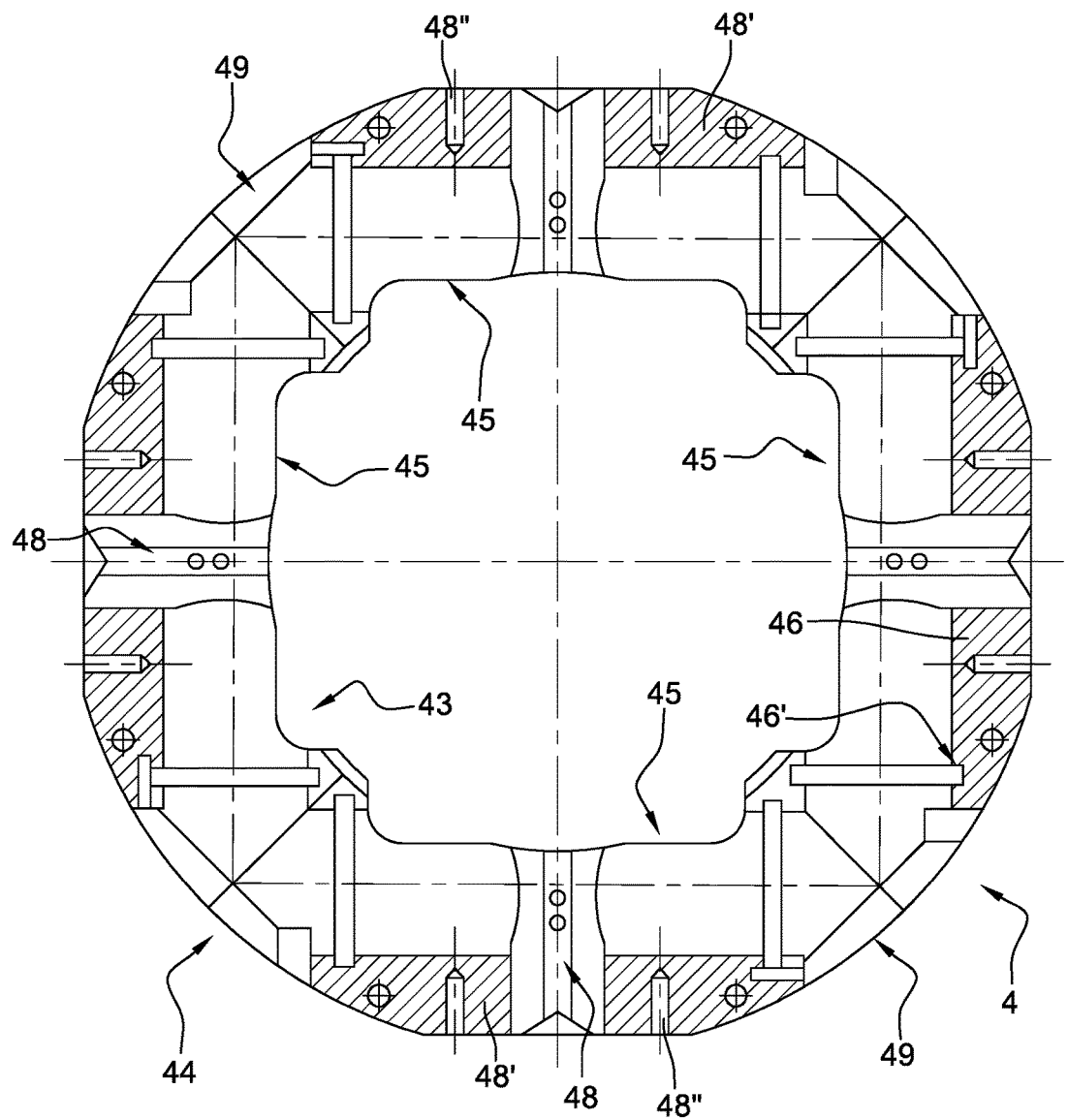
FIG. 7 is a top view, illustrating the supporting ring shown in FIG. 6.

This ring 4, more particularly shown in FIGS. 6 and 7, is made for example from aluminum. It has two opposite front faces 41 and 42, as well as two opposite radial faces, respectively inner 43 and outer 44. As shown in FIG. 12, the upper front face 41 of this ring is removably fastened onto the spacer part 31 by fastening means 4', of any appropriate type. The lower front face 42 of the ring 4 is distant from the lower tool part 2 in the position of FIG. 1 whereas, in the position of FIG. 13, this front face 42 bears against this lower tool portion 2.

As shown in particular in FIG. 1, the free front face 42 of the ring 4 defines a shoulder 42E, intended to cooperate with a complementary shoulder 2E, visible in FIG. 12, which is formed on the tool portion 2. These two shoulders allow to mutually position this ring and this tool portion, in a direction transverse with respect to the pressing direction, in this case horizontal.

At least one circular groove 41' and 42', intended for receiving an O-ring seal 41" and 42", is made in each of the faces 41 and 42. It is preferred to use, for each front face, two mutually adjacent concentric grooves. Once the mechanical members forming the upper tool portion 3 are mutually assembled, the joints 41" are pressed between the first face 41 and the flange 33. Moreover, in the active position of the tool, the joints 42" are pressed between the opposite face 42 and the facing wall of the lower tool portion 2.

The supporting ring 4 is hollowed out by a plurality of housings 45, each of which is adapted to the reception of a respective heating member 5, by optical radiation. A number of housing 45 is provided, which is equal to the number of lateral faces of the reflector. Viewed from the top, each housing extends substantially parallel to a respective side of the upper face of the concentrator 28.

Figure 8:
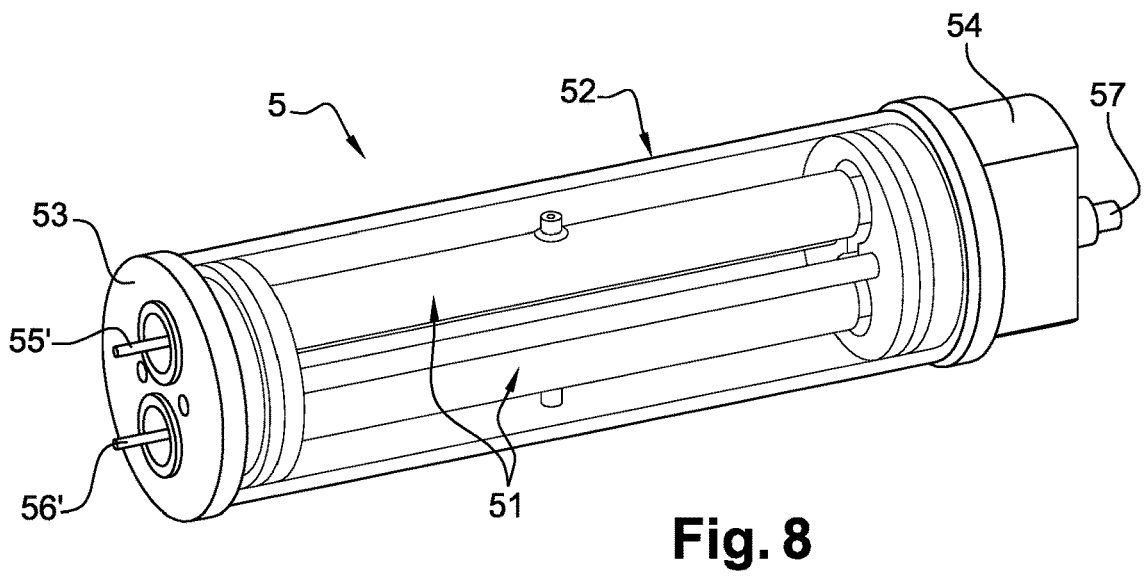
FIG. 8 is a perspective view illustrating a heating member belonging to the pressing tool according to the invention.
Figure 9:
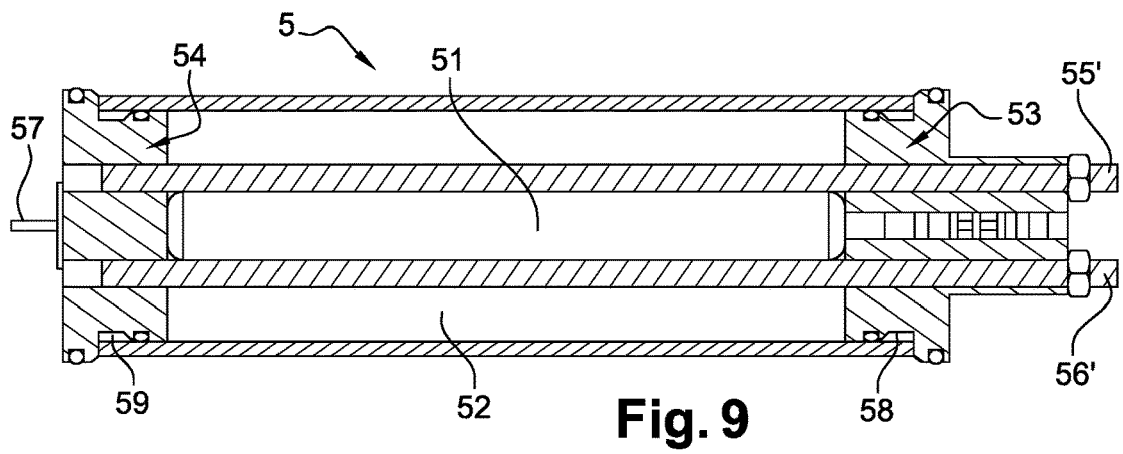
FIG. 9 is a longitudinal cross-sectional view, illustrating the heating member shown in FIG. 8.

Reference will now be made to FIGS. 8 and 9, which illustrate one 5 of the heating members provided in the tool of the invention, with it being understood that these various members are advantageously identical. In the embodiment illustrated, each heating member 5 comprises two quartz lamps 51, of a type known per se, that are surrounded by a peripheral sleeve 52, also made of quartz. Advantageously, these lamps have an adjustable power. At its two longitudinal ends, the sleeve 52 is rigidly connected to two caps having a different length, namely a cap called short cap 53 and a cap called long cap 54.

The heating member 5 further comprises respective electrical connection elements 55 and 56, which protrude out of the cap 53, by end pins 55' and 56'. These pins are connected to a power supply of a type known per se, advantageously integrated into the control unit 106 of FIG. 10, in such a way as to provide the electric power supply of the lamps 51. Moreover a centering pin 57 protrudes out of the cap 54, in such a way as to allow the positioning of the heating member 5 against the walls of its housing. Advantageously, each cap 53 and 54 forms, with the facing walls of the sleeve 52, an annular peripheral space 58 and 59. The latter is placed in communication with a source of heat-transfer fluid, in particular the one cooperating with the channels 22 and 32 above. This allows the mechanical integrity of these caps 53 and 54 to be preserved, by preventing them from being brought to a temperature that is too high during use.

Once again in reference to FIGS. 6 and 7, each housing 45 is bordered by a main wall 46, having a cylindrical transverse cross-section. The inner diameter of this housing is very slightly greater than the outer diameter of the body of each lamp, in such a way as to create fastening by wedging, or tight fit, of each lamp in its respective housing. As shown in FIG. 12, the wall 46 defines an opening 47, called emission opening, that is oriented towards the center of the ring. In this FIG. 12, the plane P45, horizontal in the present embodiment, which is parallel to the main plane of each tool portion, while passing through the center of the housing 45, is also illustrated. The emission opening 47 advantageously extends symmetrically, with respect to this plane P45.

The sleeve 52 of the lamp 5 extends, during use, against the main wall 46, while its long cap 54 extends against a secondary wall 46' (see FIG. 6), axially extending the aforementioned wall 46. Preferably, these walls 46 and 46' have different surface coatings. Thus, the main wall 46 is advantageously capable of sending back the optical radiation emitted by each lamp 5, whereas the secondary wall is advantageously capable of absorbing this radiation. For this purpose, the main wall is for example coated with a gold paint, whereas the secondary wall is for example coated with a dark paint.

Each housing 45 is placed in communication with the outer face 44 of the ring, via a cutout 48 made in the body of this ring. This allows the installation, by an operator, of each lamp in its respective housing. Each cutout is advantageously closed by a respective shutter 48', visible in FIG. 7, which is removably fastened against the outer face 44. For this purpose, there can be screws that are not shown, which penetrate into threaded orifices 48" made in this outer face. Finally the ring is equipped with end caps 49, supplied by nozzles not shown. The latter can be placed in communication with a source of vacuum described below, or with a source of inert gas.

Below, reference will once again be made to FIG. 10, which shows a facility for manufacturing objects, equipped with the pressing tool O1 according to the invention. This facility, designated as a whole by the reference 100, comprises first of all the frame 102 and the support 104, both described above. This facility is further provided with various peripheral equipment, allowing the implementation of the tool O1. This equipment is of a type known per se, in such a way that it will not be described in detail below. FIG. 10 shows:

- a control unit 106, comprising in particular means providing the electric power supply of the lamps;
- a cold production unit 108, shown schematically, which is equipped, inter alia, with nozzles, not shown, suitable for supplying the cooling channels 22, 32 made in the platens, as well as the annular spaces 58, 59 of the heating members 5;
- a vacuum unit 110, forming a source of vacuum, which is also illustrated schematically. This unit 110 is equipped, inter alia, with nozzles, not shown, suitable for supplying the end caps 49 with which the supporting ring is provided;
- a unit 111 for supplying a gas or a mixture of gases. This unit, illustrated schematically, is equipped with nozzles, not shown, suitable for supplying the aforementioned end caps 49;
- a manipulation unit 112, comprising a mobile arm 114. This unit provides the placement of the objects to be treated onto the pressing seat 282, formed by the upper surface of the reflector. This unit is advantageously provided with centering means that are not shown, such as pins penetrating into orifices made in the object to be positioned.

As indicated above the tool O2, according to a second embodiment of the invention, is mounted onto the press via means for removable fastening of a magnetic nature. For this purpose, as shown in particular in FIG. 12, each sole 60 and 70 is adapted for magnetic fastening onto a respective platen 10 and 12. Each sole is for example made from a magnetic material, cooperating with the magnetic material of the adjacent platen. Alternatively, this sole can be made from a non-magnetic material, in which case it is provided with one or more magnets for fastening onto the adjacent platen.

Figure 15:
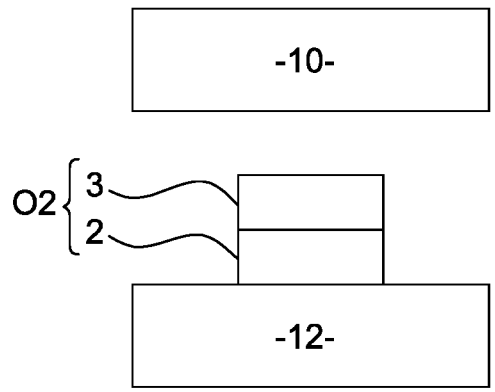
FIGS. 15 to 17 are diagrams, illustrating the installation of the two component parts of the pressing tool of FIGS. 12 to 14, on respective platens.

The implementation of the pressing tool O1 or O2, as well as of the manufacturing facility 100, as described above, will now be described in detail below. This involves first of all fastening each tool portion 2, 3 onto a respective platen. As seen above, in the case of the tool O1, this fastening is carried out by screwing, according to a predetermined positioning. The installation of the tool O2, which is different than that of the tool O1, is described in reference to FIGS. 15 to 17. These drawings show diagrams of the two tool portions 2 and 3, as well as the two platens 10 and 12.

The two tool portions 2 and 3 are first of all superimposed one on the other, via simple gravity. It should be noted that in this configuration, the complete tool O2 can be easily manipulated. Then, this tool is placed on the lower platen 12 of the press, the upper platen 10 being distant from the latter (see FIG. 15). The lower tool portion is then rigidly connected to the lower platen 10, magnetically.

Figure 16:
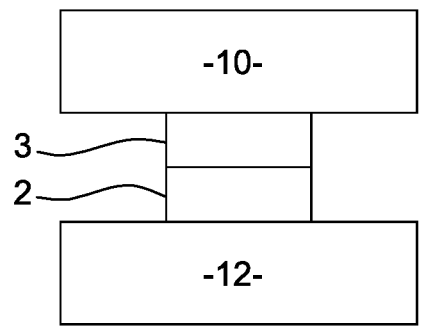
Figure 17:
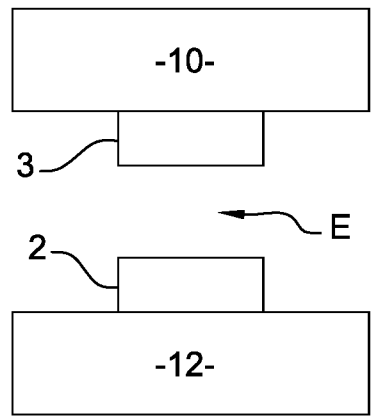

Then, the two platens are brought closer together, according to the arrow F12, until the upper tool portion 3 and the upper platen 10 come in mutual contact (see FIG. 16). In this configuration, this upper portion 3 is then rigidly connected to this platen 10, magnetically. However, no meaningful pressing force is exerted on the tool.

Then, the two platens are mutually moved apart, according to the arrow F'12. Given that the two tool portions are fastened onto a respective platen, they are thus moved apart mutually (see FIG. 17). These two portions of the tool O2 are then in a configuration analogous to that described in reference to FIG. 1, with regard to the tool O1. Then, an object to be pressed is placed onto the seat 282, which is easily accessible given the formation of an intermediate space E between the two mutually distant tool portions.

According to an advantageous alternative that is not shown, a plurality of tools can be stacked and this superposition of analogous tools can be disposed between the two platens of a single press. This alternative is very particularly adapted to magnetic tool portions, since the adjacent portions, belonging to two different tools, can be easily fastened and mutually positioned.

Figure 11:
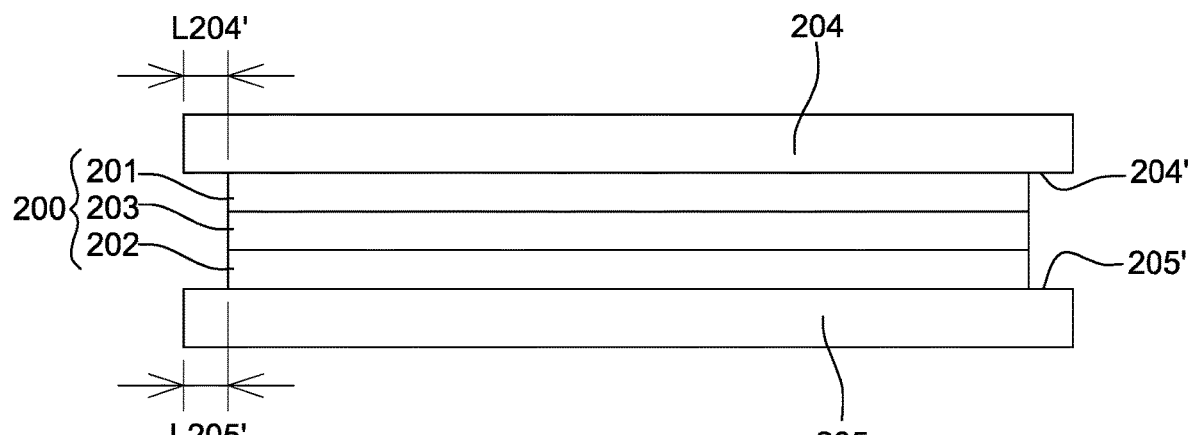
FIG. 11 is a front view, illustrating a stack intended to be treated with the pressing tool of the invention, this stack being covered by protective plates.

In the present example of an embodiment, a pressing operation is carried out on a stack of layers intended to form an all-solid Li-ion battery, as seen above. In FIG. 11 this stack, designated as a whole by the reference 200, comprises a single elementary cell composed of three layers, namely an anode layer 201, a cathode layer 202, and an intermediate layer 203 of solid electrolyte. Alternatively, it is possible for this stack to be formed by an assembly of a plurality of elementary cells like above, which are disposed one above the other and are connected in parallel, in a manner known per se. Each cell further comprises connection means, in particular of the electrical type, which are of a conventional type and are not illustrated in FIG. 11.

Preferably, a respective plate 204 and 205 is placed against each end layer 201 and 202. These plates, which are also visible in FIGS. 12 and 13, are first of all intended to provide a function of mechanical protection with respect to the concentrators 28 and 38, in such a way as to limit the stresses exerted on the latter during the pressing step. Moreover, these plates 204 and 205 allow to prevent possible dust, present on these layers, from interfering on the trajectory of the optical radiation emitted by the lamps. This latter point will be described in more detail below, in reference to FIG. 13.

Each plate is advantageously made from a material having mechanical characteristics adapted for the above functions, for example carbon or a steel of the DILVER® P1 type. Preferably, this plate has a coating that absorbs the radiation energy of the lamps, for example a dark-colored coating. For example, the thickness E204 or E205 of each plate is typically close to 5 millimeters. The two other dimensions of each plate 204 and 205, in its main plane, are close to those of the layer 201 or 202 that it covers.

Advantageously, it will be chosen to create a plate slightly larger than the layer adjacent to it. This plate thus has a peripheral edge 204' or 205', the dimension of which L204' or L205' is for example close to several millimeters. The presence of this edge allows to ensure that each layer 201 or 202 is always covered by its protective plate 204 or 205, in particular during the step of installation, on the seat 282, of the tool O1 or O2, or during the pressing step strictly speaking. It should be noted that, in FIG. 11, the respective scales of the various mechanical elements are not respected, for the purpose of better readability of the drawing.

Then, via the manipulation arm, the stack 200 is placed above, as well as its two protective plates 204 and 205. The latter are positioned and then maintained in position, via the template 24. Then, the cylinders are actuated, in such a way as to move the mobile platen towards the fixed platen, which provokes the bringing closer together of the two tool portions. At the end of this movement, the front face 42 of the ring 4 is stopped against the lower portion 2 of the tool, which provokes the compressing of the O-rings 42".

This close configuration of the tool portions, illustrated in FIG. 12 and on a larger scale in FIG. 13, allows to define a pressing chamber, designated by the reference 300 in these drawings. There are then four alternative embodiments of the invention, with regard to the possible placement of the inner volume of the pressing chamber 300 under a controlled atmosphere.

In a first alternative, the end caps 49 are connected to the source of vacuum 110, in such a way as to create a partial vacuum inside the chamber 300. As a non-limiting example, this chamber is placed at a pressure close to 10-3 mbar. In a second alternative, the end caps 49 and the source 111 of inert gas are connected, in such a way as to make the inner volume of the pressing chamber inert. These first two alternatives allow to prevent placement of the elements forming the stack in contact with the ambient air. This is very particularly advantageous in the case in which these elements have a component, such as lithium, the oxidation of which must be prevented.

According to a third alternative, the source 111 supplies a non-inert gas into the inner volume of the pressing chamber 300.

According to a fourth embodiment, the pressing chamber is confined but is not placed under vacuum, nor subjected to sweeping by gas. In other words, no particular sealing is implemented, which is advantageous in terms of simplicity. This alternative is used in the case in which the article to be pressed according to the invention, does not have any component capable of being altered under the effect of oxidation.

Then, the lamps of the heating members 5 are activated, in such a way as to increase the temperature inside the chamber 300. In the case of the stack 200, it has been seen that it can be the subject, either of a treatment at a high temperature and high pressure, or of a treatment at a lower temperature and lower pressure. In the first case, the chamber is placed at a target temperature, called pressing temperature, typically between 400 and 700° C. whereas, in the second case, the chamber is placed at a target temperature typically between 100 and 200° C.

Advantageously, the temperature is increased continuously, according to a speed for example close to 100° C. per minute. In these conditions the duration of this phase of increase in temperature, which depends on the type of assembly intended, via sintering or gluing, is typically several minutes. According to the value of the target temperature, the power of each lamp 51 is adjusted. In the case in which this threshold temperature is not very high, typically during assembly by gluing or polymerization, it is also possible to use only a portion of the aforementioned lamps.

FIG. 13 illustrates the trajectory of the optical radiation, emitted by the lamps 51 towards the stack 200 to be treated. In this FIG. 13, only the following has been shown, for more clarity:

the stack 200 and its protective plates 204, 205, two heating members 5a and 5b provided on the opposite sides of this stack, the walls 46a and 46b of the housings for receiving the lamps, the two reflectors 26 and 36, as well as the two concentrators 28 and 38.

In this FIG. 13 the stack 200, as well as the intermediate optical members 26, 28, 36 and 38 are illustrated partially according to their transverse dimension, in order to improve the readability of the trajectory of the radiation. Moreover, in such a way as to lighten all of the drawing, only the trajectory of the optical radiation downwards, namely towards the lower concentrator 28, the inner reflector 26 and the lower face of the stack 200, has been illustrated. It should be remembered that the trajectory of the optical radiation upwards, namely towards the upper concentrator 38, the upper reflector 36 and the upper face of the stack, is substantially symmetrical to the trajectory of the optical radiation downwards, with respect to the median plane P45.

Once activated, the lamps 51a, 51b of the heating members 5a and 5b emit isotropic optical radiation, viewed in a transverse cross-section. Consequently, a portion of this radiation is directed against the respective walls 46a and 46b, according to the arrows R1. As explained above, these walls have a coating suitable for reflecting this radiation, in such a way that the latter is sent back opposite these walls, according to the arrows R2. Thus, substantially all of the radiation is emitted out of the housing via the emission opening 47, according to the arrows R3. It should be noted that it is advantageous to provide absorbent walls 46' facing the cap of the lamp, as shown in FIG. 6. Indeed, these absorbent walls prevent substantial return of the thermal radiation towards this cap, in such a way as to prevent heating of the latter that would be capable of damaging it.

The radiation emitted according to R3 then passes through the opposite lateral faces of the concentrator 28, according to the arrows R4, without undergoing any substantial deviation. It then progresses towards the reflector 26, then is sent back by the latter towards the stack 200, according to the arrows R5. The radiation then reaches (arrows R6) the protective plate 204 where it is absorbed since, as seen above, this plate has a coating that absorbs this radiation energy.

It should be noted that, downstream of the reflector 26, substantially all of the radiation has a vertical direction. Moreover, this radiation is directed onto the entirety of the stack, but on the contrary, no substantial fraction of this radiation is sent outside of the lateral edges of this stack. For this purpose, R6a and R6b denote the outer fraction of this radiation, which is directed near the aforementioned lateral edges. This is very particularly advantageous, since substantially all the radiation energy is used to heat the stack 200, which prevents energy losses and ensures optimal yield.

Moreover, the mechanical members located in the immediate vicinity of this stack do not receive any substantial quantity of heat. In other words, near the lateral edges of the stack, there is a strong temperature gradient. Thus, these mechanical members do not need to have a specific resistance to high temperatures, which reduces their manufacturing cost. In particular, it is possible to place the sealing joints near the pressing zone, which reduces the overall bulk of the tool, while ensuring a manufacturing of these joints in a non-costly material. This advantage is very particularly noticeable, in the case in which the pressing is carried out under vacuum.

The use of the protective plates 204 and 205 is also advantageous, in terms of energy efficiency. Indeed, in the absence of such plates, it can be supposed that impurities, for example dust, are present on the face of the stack in contact with the optical radiation. In this case, these impurities tend to send back a fraction of the radiation, and not absorb it. This returned fraction is then directed towards the reflector 26, where it is again sent back towards the impurities, and so on. In this case, this radiation fraction is not efficient, in the sense that it is not used effectively to heat the stack. Moreover, it should be noted that the presence of dust on the pressurized silica can lead to cracking it or even breaking it.

Once the inner volume of the chamber 300 is placed at the desired target temperature, a pressing force is applied onto the opposite faces of the stack 200. During the application of this force, the bases 25 and 35 form members for transmission of the stresses, while the blocks 28 and 38 provide, besides their optical function, an additional function of pressing member.

This force is applied, while maintaining the chamber at a temperature close to the aforementioned target temperature. As a non-limiting example, in the case of assembly via sintering or diffusion welding, this pressing force is between 100 and 200 MPa. In the case of assembly via gluing or polymerization, this pressing force is between 5 and 10 MPa. The duration of this pressing phase is typically between 5 and 25 minutes. It should be noted that this duration is approximately the same, regardless of the assembly mode implemented.

In reference to FIG. 13, it should be noted that the lower tool portion 2 defines two axially distant stops for the disc 26, respectively upper 26H and lower 26 B. In an analogous manner the upper tool portion 3 defines two axially distant stops for the disc 36, respectively upper 36H and lower 36 B. It is thus possible for the disc 26 and/or the disc 36 to have a certain elasticity, in such a way that it can bear against one or the other of the aforementioned stops. These possibilities of axial travel are represented by the arrows F26 and F36, in this FIG. 13. A person skilled in the art can use this possibility for axial travel for at least one of the discs, in order to carry out the mechanical pressing operation in an optimal manner. In this respect, a person skilled in the art can also provide an axial travel of the sole 70, represented by the arrow F70 in FIG. 12, with respect to the block 35.

Once the pressing has been carried out, the lamps are deactivated in such a way as to lower the temperature in the chamber 300. When this temperature reaches a predefined value, for example close to 200° C., the vacuum unit is stopped, in such a way as to once again place the inner volume of the chamber 300 at atmospheric pressure. When the temperature of this chamber is close to the ambient temperature, the stack treated according to the invention is extracted out of the chamber by the manipulation arm. Via the pressing operation, the layers forming this stack have the desired cohesion. This stack then undergoes optional later operations of a known type, in particular, the installation of protective coatings and/or cutting and/or the addition of electric contacts.

The pressing operation is advantageously carried out, in such a way that at least a thin layer, preferably all the thin layers of the battery, have a porosity of less than 20%, preferably less than 10% and even more preferably less than 5%. A compact deposit is a deposit that does not comprise cavities or cracks. However, it comprises porosities, the concentration of which is expressed as a percentage and is calculated in the following manner:

Porosity [%]=[(density of the bulk material−true density)/true density]×100 with the knowledge that the "true density" is the density measured on the deposited layer and that the density of the bulk material is the massive density of the deposited material, while ignoring the presence of particles, the stacking of which forms a porosity.

The batteries obtained according to the invention, by the use of the above pressing tool, have a high power density, when the electrodes are thin. They also have a high energy density (approximately two times more than the known lithium-ion batteries), via the very low void ratio.

LIST OF REFERENCE SYMBOLS

The following numerical references are used in the present description.

O1 Pressing tool
O2 Pressing tool
2 Portion of the tool
3 Portion of the tool
4 Ring
4' Fastening means/mechanism
5 Heating member
10 Platen
11 Press cheek
12 Platen
13 Ball joint
14 Plate
20 Sole
21 Spacer part
22 Channels
23 Flange
24 Template
25 Base
26 Reflector disc
27 Pad
27' Pad
28 Concentrator block
29 Collar
30 Sole
31 Spacer part
32 Channels
33 Flange
35 Base
36 Reflector disc
37 Pad
37' Pad
38 Concentrator block
41 Front face
41' Grooves
41" Joint
42 Front face
42' Grooves
42" Joint
43 Radial face
44 Radial face
45 Housings
46 Wall
46' Wall
47 Emission opening
48 Notches
48' Shutters
48" Threaded orifices
49 End caps
51 Lamps
52 Sleeve
53 Cap
54 Cap
55 Electrical-connection element
55' Pin
56 Electrical-connection element
56' Pin
57 Centering pin
58 Annular space
59 Annular space
60 Sole
70 Sole
102 Support
104 Frame
106 Control unit
108 Cold production unit
110 Vacuum unit
111 Unit for supplying gas
112 Manipulation unit
114 Mobile arm
131 Female sphere
132 Male sphere
200 Stack
201 Anode layer
202 Cathode layer
203 Layer of solid electrolyte
204 Plate
204' Edge
205 Plate
205' Edge
221 Input of channel 22
222 Connector
281 Face of concentrator block 38
282 Face of concentrator block 38
283 Face of concentrator block 38
291 Orifices
292 Notch
293 Notch
294 Dog
295 Locking member
296 Rod
321 Input of channel 32
322 Connector
A283 Angle with respect to the vertical direction
E Intermediate space
E204 Thickness of plate 204
E205 Thickness of plate 205
F12 Arrow
F'12 Arrow
F26 Travel of reflector disc 26
F36 Travel of reflector disc 36
F70 Travel of sole 70
H28 Height of concentrator block 28
2E Shoulder
42E Shoulder
26B Stop of reflector disc 26
26H Stop of reflector disc 26
36H Stop of reflector disc 36
36B Stop of reflector disc 36
L204' Width of edge 204'
L205' Width of edge 205'
P45 Plane of housings 45
R1 Trajectory of the radiation
R2 Trajectory of the radiation
R3 Trajectory of the radiation
R4 Trajectory of the radiation
R5 Trajectory of the radiation
R6 Trajectory of the radiation R6a Outer fraction radiation
R6b Outer fraction radiation

What is claimed is:

1. A hot-pressing tool to be mounted on a press, the hot-pressing tool comprising:
a first tool portion including a first fastener member to removeably fasten the first tool portion to a first platen;
a second tool portion including a second fastener member to removeably fasten the second tool portion to a second platen;
a pressing chamber to receive an object to be pressed, the pressing chamber being defined by movement of the first tool portion and the second tool portion with respect to one another between a distant position and a close position;
a heating device having heating members to heat an inner volume of the pressing chamber via optical radiation, the heating device having a concentration member that includes, for each of the first tool portion and the second tool portion, a concentrator block to concentrate the optical radiation in a direction of the object, each of the concentrator blocks having two opposite front faces connected by oblique lateral faces, each of the oblique lateral faces being adjacent to the respective heating member, and the concentrator blocks form a first pressing member and a second pressing members respectively; and
the first pressing member on the first tool portion, and the second pressing member on the second tool portion, to exert, respectively, a pressing force on opposite faces of the object when received in the pressing chamber, wherein the first pressing member is a lower pressing member comprising an upper front face having a reception seat to receive the object.

2. The hot-pressing tool of claim 1, wherein each of the heating members having a sleeve to receive a quartz lamp, and at least one cap axially extending the sleeve, such that facing walls of the cap and facing walls of the sleeve define an annular space configured for communication with a source of a heat-transfer fluid.

3. The hot-pressing tool of claim 2, wherein one of the pressing members defines a polygonal seat to receive the object to be pressed, and the heating member is provided along each side of the polygonal seat.

4. The hot-pressing tool of claim 2, further comprising an open housing to receive each heating member, the open housing defining an opening configured to emit the optical radiation.

5. The hot-pressing tool of claim 4, wherein the concentration member comprises a reflection section for walls of the open housing, the reflection section being placed facing a radiating zone of the heating member, the reflection section having a coating of the reflection section configured to reflect the optical radiation.

6. The hot-pressing tool of claim 5, wherein the walls of the open housing include at least one absorption section to face a non-radiating zone of the heating member, the absorption section having a coating to absorb the optical radiation.

7. The hot-pressing tool of claim 4, wherein the first tool portion comprises an annular supporting member to define each open housing.

8. The hot-pressing tool of claim 7, wherein the annular supporting member comprises a free front face arranged against the second tool portion.

9. The hot-pressing tool of claim 8, further comprising at least one seal member arranged between the free front face and the second tool portion, the seal members being received in at least one groove in the free front face.

10. The hot-pressing tool of claim 7, wherein the annular supporting member has a hollowed out region with at least one cutout to facilitate access to a respective open housing, from an outer face of the annular supporting member.

11. The hot-pressing tool of claim 10, wherein the annular supporting member comprises at least one shutter, removably fastened onto the outer face, to close each cutout.

12. The hot-pressing tool of claim 7, further comprising a transverse-positioning device to facilitate mutually positioning of the first tool portion and the second tool portion in a direction transverse with respect to a pressing direction.

13. The hot-pressing tool of claim 12, wherein the transverse-positioning device comprise complementary shoulders respectively arranged on the annular supporting member and also on the second tool portion.

14. The hot-pressing tool of claim 4, wherein the concentration member comprises, for each of the first tool portion and the second tool portion, a reflection member to reflect the optical radiation, interposed along a trajectory of the optical radiation between an emission opening and a seat to receive the object to be pressed.

15. The hot-pressing tool of claim 14, wherein each concentrator block
is composed of silica.

16. The hot-pressing tool of claim 14, wherein the reflection member:
is disposed against a front face of the concentrator block,
is composed of polished aluminum.

17. The hot-pressing tool of claim 1, further comprising an atmosphere control member, for connection to an inert gas supply source and/or a vacuum source, to place the pressing chamber under a controlled atmosphere.

18. The hot-pressing tool of claim 1, wherein the first fastener member and the second fastener member each comprises a mechanical fastener.

19. The hot-pressing tool of claim 1, wherein the first fastener member and the second fastener member each comprises a magnetic fastener.

20. A method for using a hot pressing tool, the method comprising:
providing a hot pressing tool that includes:
a first tool portion including a first fastener member to removeably fasten the first tool portion to a first platen;
a second tool portion including a second fastener member to removeably fasten the second tool portion to a second platen;
a pressing chamber to receive an object to be pressed, the pressing chamber being defined by movement of the first tool portion and the second tool portion with respect to one another between a distant position and a close position;
a heating device having heating members to heat an inner volume of the pressing chamber via optical radiation, the heating device having a concentration member that includes, for each of the first tool portion and the second tool portion, a concentrator block to concentrate the optical radiation in a direction of the object, each of the concentrator blocks having two opposite front faces connected by oblique lateral faces, each of the oblique lateral faces being adjacent to the respective heating member, and the concentrator blocks form a first pressing member and a second pressing members respectively; and the first pressing member on the first tool portion, and the second pressing member on the second tool portion, to exert, respectively, a pressing force on opposite faces of the object when received in the pressing chamber, wherein the first pressing member is a lower pressing member comprising an upper front face having a reception seat to receive the object, placing the first tool portion and the second tool portion in the distant position;

arranging the object to be pressed in the reception seat;

moving the first tool portion and the second tool portion towards the close position so as to define the pressing chamber and confine the object therein;

heating, via the heating device, an inner volume of the pressing chamber to a target temperature; and exerting a pressure on opposite faces of the object to be pressed, while maintaining the inner volume of the pressing chamber at a temperature that is close to the target temperature.

* * * * *